Sept. 7, 1965   R. W. CARLISLE   3,204,585
BLAST RESISTANT STRUCTURE
Filed Nov. 25, 1960
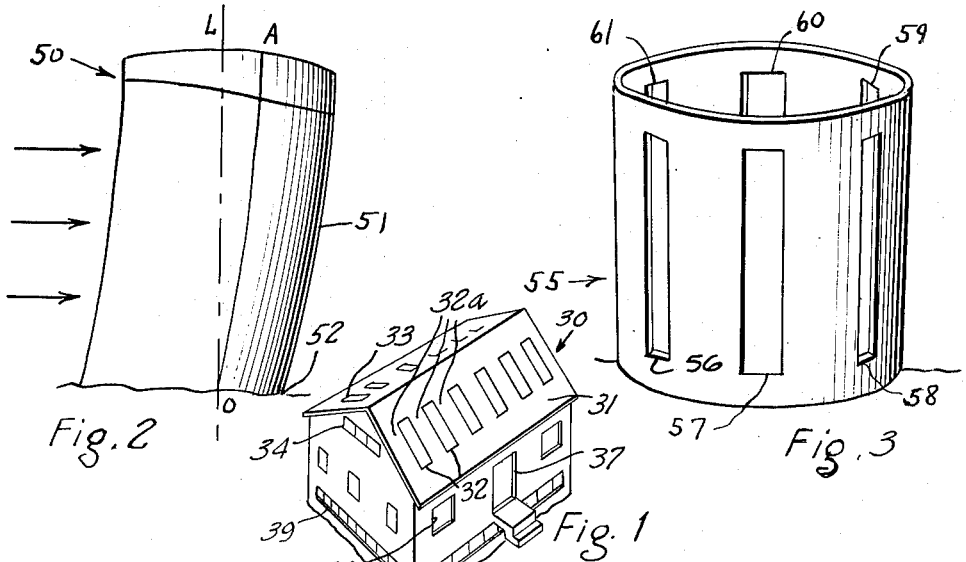
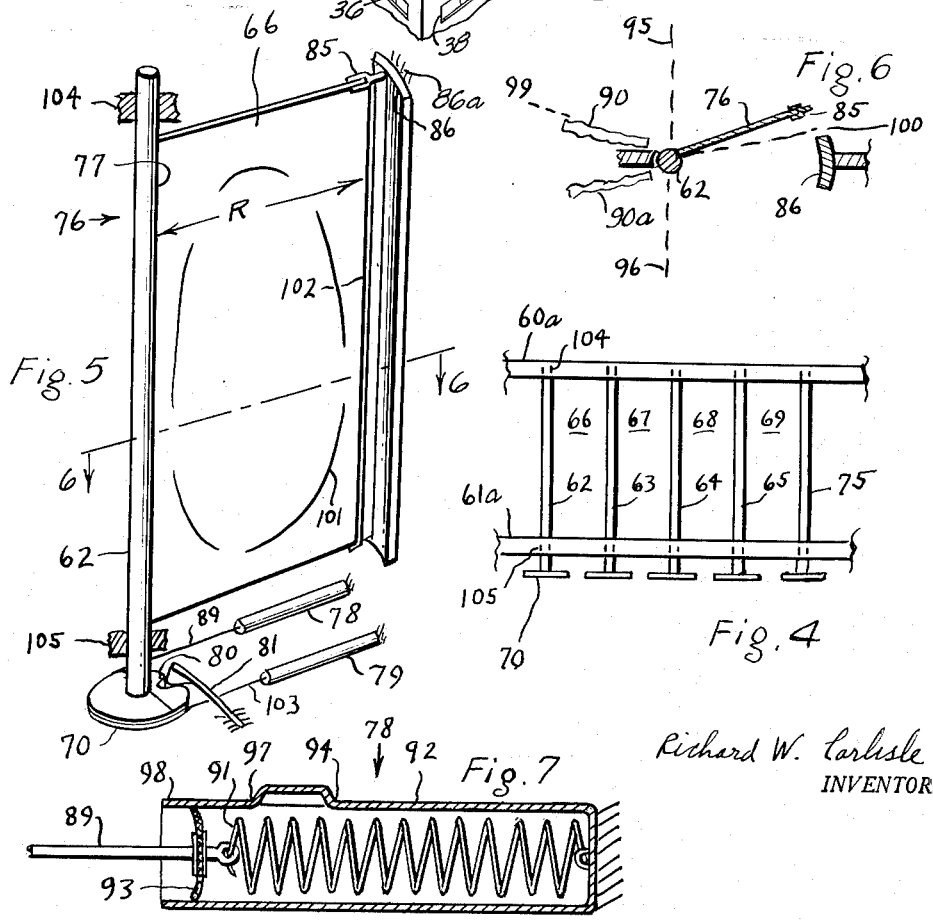
Richard W. Carlisle
INVENTOR.

United States Patent Office 3,204,585
Patented Sept. 7, 1965

3,204,585
BLAST RESISTANT STRUCTURE
Richard W. Carlisle, Greenburgh, N.Y., assignor to Carlisle Research and Development Corporation, Elmsford, N.Y., a corporation of New York
Filed Nov. 25, 1960, Ser. No. 71,639
4 Claims. (Cl. 109—1)

This invention relates to a structure such as a building or a part of a building, having improved resistance to airborne shock waves and major atmospheric disturbances by reason of the action of relief ports. These ports are normally closed by air-impervious closure members, which in many cases may be transparent and serve as windows.

More particularly, this invention relates to structures having alternate surface panels or windows of fixed and movable characteristics. The panels which are movable will be termed closure members. These are arranged to swing open upon the incidence of air pressure greater than a predetermined value, to remain open for the duration of the shock wave and subsequently to re-close.

The types of air-borne disturbances which such a structure is intended to withstand are: waves caused by supersonic aircraft; nuclear explosions in the "fringe area"; and hurricanes.

In one form of structure constructed for such purposes according to the prior art, namely nuclear bomb shelters, it has been customary as illustrated in U.S. Patent No. 2,704,983, to utilize heavy masonry without windows and to cover the structure with earth. A shelter of such characteristics has failed to secure general public acceptance, which has greatly retarded the over-all program of defense against nuclear attack. It will be shown that frame houses cannot withstand "overpressures" greater than 4 pounds per square inch, which corresponds to a 20 kiloton atomic burst one-half mile distant; in fact, ordinary windows break between 1 and 2 pounds per square inch (abbreviated p.s.i.). I have found that 4 pounds per square inch is, however, well within the tolerance of a human being.

It is a principal object of this invention to raise the capability of windows to withstand pressures of the order of 4 p.s.i. by arranging them to swing freely under the action of a blast. Such an operation need not in itself cause damage to personnel within the building; the hazard of flying glass will be eliminated within this pressure range and it is presumed that personnel will secure shelter from radiation behind suitable shields within the building. After a nuclear blast, it is another object of this invention to re-close the windows and thus provide protection against "fallout."

It is another object to provide parts of aircraft, such as cabins, which will withstand a blast by having overpressure relief ports.

It is another object to provide components of superstructures, such as building exhaust stacks, marine vessel funnels or the like, which will withstand a blast by having overpressure relief ports.

A fringe area nuclear or atomic burst is propagated at approximately the speed of sound, resulting in a sharp wave front commonly called a blast. After approximately one second, the "overpressure" falls to zero and then reverses, establishing a partial vacuum.

FIG. 1 is a perspective view of a house constructed according to the principles of this invention, having overpressure relief ports in the roof and along the basement walls.

FIG. 2 is a perspective drawing of the upper part of a marine funnel which was damaged by a blast.

FIG. 3 is a perspective view of an open-ended, generally round structure constructed according to the principles of this invention, which may be a component of a superstructure such as an exhaust stack, and which has relief ports distributed around the surface thereof.

FIG. 4 is an enlarged plan view of a portion of a port as indicated in FIGS 1 and 3, showing four individual closure members.

FIG. 5 is a perspective view of an individual closure member, which is affixed to an axle disposed along one long edge.

FIG. 6 is a cross-sectional view along the line 6—6 of FIG. 5, showing cushion stops and with the closure member moved from fully closed position.

FIG. 7 is an enlarged cross-sectional view, showing the spring and shock-absorber or dashpot arrangement of FIG. 5, arranged to control the rate of closure of the closure member.

As described in connection with Fig. 4.22 of "The Effects of Nuclear Weapons," published by the U.S. Atomic Energy Commission, 1957, the typical effect of 4 p.s.i. positive peak overpressure is to cause a frame house to suffer instantaneous fracture of the windows, collapse of the roof and collapse of the first floor into the basement. The fracture of the windows admitted air into the house and relieved the overpressure, thus preventing further damage to equalize the pressure on the roof. Analogously, basement windows having less area than those in the first floor, equalization of pressure on the first floor did not occur. By overpressure is meant the excess of static air pressure relative to normal ambient pressure at a specific moment.

A house constructed according to the principles of this invention is shown in FIG. 1, in which alternate panels such as 32a, 32 are respectively made fixed and movable for the purpose of equalizing overpressure. The roof 31 of the house 30 has pressure-relief port areas such as 32 and 33; the end wall of the attic has the port areas 34 and the combination is arranged to relieve overpressure on the roof in case of a major airborne disturbance. The aggregate area of the roof ports should represent a percentage of the total roof area in the same proportion that the windows in the walls bear to the total wall area, within a reasonable limit which should be determined by experience. The side windows such as 36 will be designed similarly to the port areas in the roof, except that they will be transparent whereas transparency is not required in the roof ports. Exterior doors as indicated at 37 will be constructed with port areas in a similar manner. In general, fixed panels thruout the house are supported on principal frame members such as upright beams and horizontal joists, and ported areas are contained by such principal frame members. Frameless structures such as corrugated sheet metal buildings are comparatively susceptible to blast, and should have not only port areas such as 36 but frame members such as 60a, 61a for supporting the structure along the peripheries of the fixed and ported areas. Collapse of first floor joists is minimized by providing port areas 38, 39 along the sides of the exposed basement wall commensurate with the port area, i.e., the window area, of the first floor.

In the above embodiments of my invention, the structure to be protected by the relief of overpressure is normally closed on all sides. My invention may also be applied to structures having a side normally open, such as ship superstructures including stacks or funnels 55, as shown in FIG. 3. The damage which may occur to a funnel is illustrated in FIG. 2, wherein an atomic blast approaching from the left has radically deformed the funnel 50 toward the right; the center axis, originally along the line OL, has been moved to OA; and the right-hand side 51 is bowed outward while the bottom 52 remains in place. The use of pressure relief areas on such a structure is illustrated in FIG. 3. The generally round structure 55 has port areas 56–61 distributed uniformly thereover. It may be seen that each port area is rectangular and that the longer dimension of each one is parallel to a straight-line portion of the structure.

According to this invention, each port area is constructed with one or more movable panes or closure members, as illustrated in FIG. 4. The elongated members 60a and 61a represent portions of the principal frame members of the building structure, or members affixed directly thereto. Port areas constructed in roofs, for instance, should be disposed between the main rafters or beams, so that none need be cut away. Windows are normally disposed across the span of two studs or beams with one cut away, but the upper and lower sills are strongly affixed to the adjacent studs or beams so that there is very little weakening of the wall, according to standard wooden building practise. In the port structure of FIG. 4, the various closure members 66–69 are affixed along one long side to the respective axles 62–65. The elongated member 75 represents the next successive axle; alternatively, a frame member may be used at this point.

An individual double action closure member, pane or window assembly is shown in FIG. 5. The assembly generally indicated at 76 is comprised essentially of the closure member 66, the axle 62 to which the closure member is affixed along one edge 77 thereof, bearings 104 and 105, moisture-tight gaskets 85 on the closure member and gasket 86 affixed to the exterior frame 86a, and means for closing the window comprising the assemblies 78 and 79 containing springs which act in cooperation with the control wheel 70, and the latch mechanism comprising the spring-controlled rider 81 which acts in cooperation with the notch 80 in the control wheel 70. The latch is to be adjusted to release the closure member at a value of overpressure just below that at which collapse of the adjacent portion of the structure would occur, and below that at which the closure member itself would fracture. The order of magnitude of this overpressure is 2 p.s.i., resulting in 50 pounds force along the free edge 102 of the closure member. Unwanted intrusion of burglars or the like is restricted by the close spacing between axles or the width of the closure member, in addition to the high pressure required to release the latch. One direction is to permit movement upon the impact of the blast and the other to permit movement upon the action of the negative wave.

Each moving closure member may comprise a transparent pane or an opaque panel. A preferred material for a transparent pane is automobile-type safety glass; however, single-layer glass may be used if the radial dimension R is kept sufficiently small to maintain the stiffness of the pane as a diaphragm which would otherwise be susceptible to resonant vibration, and especially if a rubber-like gasket 85 shown in part in FIG. 5 is provided around the periphery to assist in preventing resonance. The stiffness and strength may also be greatly increased by introducing curvature into the surface as indicated by the broken line 101. Opaque closure members may be made from marine plywood, or preferably glass fiber impregnated with polyester resin which can withstand rather high temperature. The preferred material for gaskets is silicone rubber, because that is capable also of withstanding high temperatures. It may be seen that the gasket 86 is cylindrically concave on the side of the closure member opposite to the axle, in order to provide a moisture-tight seal regardless of the accuracy of positioning of the closure member upon closure.

The closure members are fast-acting and may move with high velocity upon the incidence of a blast, and must be decelerated without fracture. Accordingly, cushioned stops 90 and 90a may be used at the positions of extreme travel of the closure member.

An illustrative closure spring assembly 78 is illustrated in FIG. 7. This utilizes the spring 91 which acts by means of the tension member 89 to impart tension upon one side of the control wheel 70. A dashpot comprised of the cylinder 92 and the piston 93 controls the rate of closure of the closure member. The cylinder wall is straight from the point of maximum spring compression to a point 94, which is the position of the piston when the closure member is 90° open, as at 95 in FIG. 6. From position 97 to position 94 of the piston 93, which corresponds to a nearly-closed condition of the closure member, the cylinder is vented as indicated so that the closure member can move rapidly. From point 97 to the end of the stroke, as at 98, the cylinder is straight so that the movement of the closure member is slowed. Travel of the closure member from position 99 in FIG. 6 to position 95 may be adjusted to consume a time delay interval of several seconds, so as to retain the closure member substantially wide open until the negative wave of an atomic burst or the vacuum region of a hurricane has subsided, for the purpose of equalizing overpressure within a given structure, the closure member is then closed to give optimum protection against fallout, and decelerated near the closure position to facilitate the engagement of the latch 81.

Although a closure member constructed according to the principles of this invention has been described as being arranged to have a "double action," i.e., to swing either inwards or outwards, many cases may arise where only inward movement is required. This is apt to occur where a building is sufficiently rigid to withstand the requisite overpressure and it is desired principally to provide transparent closure members which will not fracture upon the incidence of a blast. It is apt to occur also where only one side of a building is equipped with closure members, as when it is built against a hillside. However, protection from hurricane suction can be secured in such cases having closure members which open only inwardly, by manually opening the closure members before the suction action occurs. Manual operation of the spring latch 81 may be accomplished by applying mechanical leverage, as well known in the art.

In the construction of a structure herein described, certain specific features of the invention may be modified within the scope of the claims.

I claim:

1. An overpressure port for use in an exposed portion of a building provided with a generally rectangular closure member having a pair of sides substantially shorter than the width of a door, and having longer sides; and axle means connecting a member rigidly associated with said building with one longer side of said closure member along the entire length thereof to provide the principal support for the same and to provide means for double acting pivotal movement; means for excluding fall-out or the like comprised of cooperating weather-proofing means along at least the longer side of the closure member, opposite the axle means, and on the side of the port adjacent said longer side; means for restoring the closure member to substantially closed position; and latch means comprised of cooperating rider and notched members, and spring means adapted to press one against the other, one cooperating member being associated with said building and the other associated with the closure member and adapted to move therewith, the cooperating members retaining the closure member closed only for pressures within a predetermined ceiling of the order of 2 p.s.i. whereby to permit the closure member to open upon the incidence of a blast of a nuclear weapon or other severe airborne disturbance.

2. A closure member as set forth in claim 1, in combination with a cushioned stop located at a position of extreme inward travel of said closure member.

3. A structure comprised of walls and a roof, said roof having distributed over the surface thereof a plurality of closure members as set forth in claim 1.

4. A structure comprised of walls and a roof, said walls having distributed over the surface thereof a plurality of closure members as set forth in claim 1.

References Cited by the Examiner

UNITED STATES PATENTS

| | | | |
|---|---|---|---|
| 270,309 | 1/83 | Harrison et al. | 20—53 |
| 1,124,941 | 1/15 | Norton | 16—70 |
| 1,269,764 | 6/18 | Weaver | 16—142 |
| 2,358,143 | 9/44 | Castor | 20—4 |
| 2,497,611 | 2/50 | Jerousek | 16—86 |
| 2,772,450 | 12/56 | Stewart | 20—53 |
| 2,774,116 | 12/56 | Wolverton | 20—16 |
| 2,904,819 | 9/59 | Seaman | 16—151 |
| 2,908,050 | 10/59 | Sullivan et al. | 20—16 |

OTHER REFERENCES

The Effects of "Nuclear Weapons"; Published by the United States Atomic Energy Commission, June 1957, for sale by The Superintendent of Documents, U.S. Government Printing Office, Washington 25, D.C.

HARRISON R. MOSELEY, *Primary Examiner.*

JOSEPH D. SEERS, ALBERT H. KAMPE, BENJAMIN BENDETT, *Examiners.*